(12) United States Patent
Hamano et al.

(10) Patent No.: US 6,225,010 B1
(45) Date of Patent: May 1, 2001

(54) LITHIUM ION SECONDARY BATTERY AND MANUFACTURE THEREOF

(75) Inventors: Kouji Hamano; Yasuhiro Yoshida; Hisashi Shiota; Shigeru Aihara; Michio Murai; Takayuki Inuzuka; Sho Shiraga, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/341,667

(22) PCT Filed: Nov. 19, 1997

(86) PCT No.: PCT/JP97/04198

§ 371 Date: Jul. 19, 1999

§ 102(e) Date: Jul. 19, 1999

(87) PCT Pub. No.: WO99/26306

PCT Pub. Date: May 27, 1999

(51) Int. Cl.[7] .............................. H01M 6/18; H01M 2/16; H01M 4/58

(52) U.S. Cl. .......................... 429/306; 429/144; 429/212; 429/231.95; 29/623.4

(58) Field of Search .................................... 429/306, 144, 429/212, 231.95; 29/623.4

(56) References Cited

U.S. PATENT DOCUMENTS

| | | | |
|---|---|---|---|
| 5,340,672 | * | 8/1994 | Kubota et al. ........................ 429/249 |
| 5,437,692 | * | 8/1995 | Dasgupta et al. .................... 29/623.1 |
| 5,512,389 | * | 4/1996 | Dasgupta et al. ..................... 429/192 |
| 5,567,539 | * | 10/1996 | Takahashi et al. ...................... 429/57 |
| 5,658,686 | * | 8/1997 | Akashi ................................. 429/190 |
| 5,741,608 | * | 4/1998 | Kojima et al. ......................... 429/94 |
| 5,741,609 | * | 4/1998 | Chen et al. ........................... 429/192 |
| 5,753,387 | * | 5/1998 | Takami et al. ........................ 429/194 |
| 5,916,707 | * | 6/1999 | Omaru et al. ......................... 429/163 |
| 5,981,107 | * | 11/1999 | Hamano et al. ................. 429/231.95 |
| 6,024,773 | * | 2/2000 | Inuzuka et al. ...................... 29/623.4 |
| 6,046,268 | * | 4/2000 | Ochoa et al. .......................... 524/495 |
| 6,096,453 | * | 8/2000 | Grunwald .............................. 429/212 |
| 6,143,444 | * | 11/2000 | Roh ...................................... 429/217 |

FOREIGN PATENT DOCUMENTS

| | | | |
|---|---|---|---|
| 0848445A1 | * | 6/1998 | (EP) . |
| WO99/26306 | * | 5/1999 | (JP) . |

OTHER PUBLICATIONS

Derwent –Acc–No: 1999–385434.*

* cited by examiner

*Primary Examiner*—Patrick Ryan
*Assistant Examiner*—Kiley Stoner
(74) *Attorney, Agent, or Firm*—Oblon, Spivak, McClelland, Maier & Neustadt, P.C.

(57) ABSTRACT

A lithium ion secondary battery. The battery maintains an electrical connection between electrodes without using a firm case and can have an increased energy density at a reduced thickness while exhibiting excellent charge and discharge characteristics. The battery includes a plurality of electrode laminates each having a positive electrode, a negative electrode and a separator. The positive electrode includes a positive electrode active material layer and a positive electrode current collector. The negative electrode includes a negative electrode active material layer and a negative electrode current collector. This separator is impregnated with a lithium ion-containing electrolytic solution and is interposed between the electrodes in intimate contact. The positive electrode, negative electrode and separator are joined together in intimate contact with porous adhesive resin layers having through holes. The through holes are filled with electrolytic solution to connect the positive electrode active material layer, the negative electrode active material layer and the separator layer.

12 Claims, 9 Drawing Sheets

3: POSITIVE ELECTRODE
4: SEPARATOR
5: NEGATIVE ELECTRODE
8: ELECTRODE LAMINATE
11: ADHESIVE RESIN LAYER

3: POSITIVE ELECTRODE
4: SEPARATOR
5: NEGATIVE ELECTRODE
8: ELECTRODE LAMINATE
11: ADHESIVE RESIN LAYER

6: POSITIVE ELECTRODE COLLECTOR
7: POSITIVE ELECTRODE ACTIVE LAYER
9: NEGATIVE ELECTRODE ACTIVE LAYER
10: NEGATIVE ELECTRODE COLLECTOR
12: THROUGH-HOLE

13: SEPARATOR MATERIAL
14: AN APPLICATOR FOR DELIVERING DROPS OF THE ADHESIVE RESIN
15: BAR COATER
16: BACK-UP ROLE
17: ROLE OF A SEPARATOR

18: SPRAY GAN

21: EMULSIFIED SOLUTION OF AN ADHESIVE RESIN
22: BACK-UP ROLE
24: SQUEEGEE ROLLS

1: BATTERY CASE
2: ELECTRODE BODY
3: POSITIVE ELECTRODE
4: SEPARATOR
5: NEGATIVE ELECTRODE

LITHIUM ION SECONDARY BATTERY AND MANUFACTURE THEREOF

BACKGROUND OF THE INVENTION

1. Field of the Invention

This invention relates to a lithium ion secondary battery comprising a positive electrode and a negative electrode facing each other via a separator supporting an electrolytic solution. More particularly, it relates to a battery structure providing improved electrical connections between each of a positive electrode and a negative electrode and a separator so that a battery may have an arbitrary shape, such as a thin shape, and a process for forming such a structure.

2. Discussion of the Background

There has been an eager demand for reduction in size and weight of portable electronic equipment, and the realization relies heavily on improvement of battery performance. To meet the demand, development and improvement of a variety of batteries have been proceeding. Battery characteristics expected to be improved include increases in voltage, energy density, resistance to high load, freedom of shape, and safety. Of available batteries, lithium ion batteries are secondary batteries that have achieved the most a high voltage, a high energy density, and excellent resistance to high load and will undergo successive improvements.

A lithium ion secondary battery mainly comprises a positive electrode, a negative electrode, and an ion conducting layer interposed between the electrodes. The lithium ion secondary batteries that have been put to practical use employ a positive electrode plate prepared by applying to an aluminum current collector a mixture comprising a powdered active material, such as a lithium-cobalt complex oxide, a powdered electron conductor, and a binder resin; a negative electrode plate prepared by applying to a copper current collector a mixture of a powdered carbonaceous active material and a binder resin; and an ion conducting layer made of a porous film of polyethylene, polypropylene, etc. filled with a nonaqueous solvent containing lithium ions.

FIG. 9 schematically illustrates a cross section of a conventional cylindrical lithium ion secondary battery disclosed in JP-A-8-83608. In FIG. 9 reference numeral 1 indicates a battery case made of stainless steel, etc. which also serves as a negative electrode terminal, and numeral 2 an electrode body put into the battery case 1. The electrode body 2 is composed of a positive electrode 3, a separator 4, and a negative electrode 5 in a rolled-up form. In order for the electrode body 2 to maintain electrical connections among the positive electrode 3, the separator 4, and the negative electrode 5, it is necessary to apply pressure thereto from outside. For this purpose, the electrode body 2 is put into a firm metal-made case to maintain all the planar contacts. In the case of rectangular batteries, an external pressing force is imposed to a bundle of strip electrodes by, for example, putting the bundle in a rectangular metal case.

That is, a contact between a positive electrode and a negative electrode in commercially available lithium ion secondary batteries has been made by using a firm case made of metal, etc. Without such a case, the electrodes would be separated, and the battery characteristics would be deteriorated due to difficulty in maintaining electrical connection between electrodes via an ion conducting layer (separator). However, occupying a large proportion in the total weight and volume of a battery, the case causes reduction in energy density of the battery, Moreover, being rigid, it imposes limitation on battery shape, making it difficult to make a battery of arbitrary shape.

Under such circumstances, development of lithium ion secondary batteries which do not require a case has been proceeding, aiming at reductions in weight and thickness. The key to development of batteries requiring no case is how to maintain an electrical connection between each of a positive electrode and a negative electrode and an ion conducting layer (i.e., separator) interposed therebetween without adding an outer force. Connecting means requiring no outer force that have been proposed to date include a structure in which electrodes and a separator are brought into intimate contact by means of a resin and the like.

For example, JP-A-5-159802 teaches a method in which an ion conducting solid electrolyte layer, a positive electrode, and a negative electrode are heat-bonded into an integral body by use of a thermoplastic resin binder. According to this technique, electrodes are brought into intimate contact by uniting the electrodes and an electrolyte layer into an integral body so that the electrical connection between electrodes is maintained to perform the function as a battery without applying outer force.

As mentioned above, conventional lithium ion secondary batteries having the above-mentioned structures have their several problems. That is, those in which a firm case is used for ensuring intimate contacts between electrodes and a separator and electrical connections between electrodes have the problem that the case which does not participate in electricity generation has a large proportion in the total volume or weight of a battery, which is disadvantageous for production of batteries having ahigh energy density. Where the proposed method comprising bonding electrodes and an ion conductor with an adhesive resin is followed, for example, where a solid electrolyte and electrodes are merely brought into contact via an adhesive resin, the resistance to ion conduction within a battery increases due to the great resistance of the adhesive resin layer, resulting in reductions of battery characteristics.

Further, the battery according to JP-A-5-159802 supra, in which electrodes and a solid electrolyte are joined with a binder, is disadvantageous in terms of ion conductivity as compared with, for example, batteries using a liquid electrolyte because the interface between an electrode and an electrolyte is covered with the binder. Even though an ion-conducting binder is employed, there is no binder generally known to be equal or superior in ion conductivity to a liquid electrolyte, and it has been difficult to achieve battery performance equal to that of a battery using a liquid electrolyte.

SUMMARY OF THE INVENTION

In order to solve these problems, the inventors of the present invention have conducted extensive study on a favorable method for adhering a separator to electrodes. The present invention has been reached as a result. Accordingly, an object of the present invention is to provide a lithium ion secondary battery and a process for producing the same, in which a separator and electrodes are brought into intimate contact without using a firm battery case and yet without suffering from an increase in resistance of ion conduction through electrodes. That is, the object is to provide a lithium ion secondary battery which can have an increased energy density, a reduced thickness, and an arbitrary shape and exhibits excellent charge and discharge characteristics and a process for producing the same.

A first lithium ion secondary battery according to the present invention comprises a plurality of electrode laminates each having a positive electrode comprising a positive electrode active material layer and a positive electrode current collector, a negative electrode comprising a negative electrode active material layer and a negative electrode current collector, a separator which is interposed between the positive electrode and the negative electrode and holds a lithium ion-containing electrolytic solution, and a porous adhesive resin layer which joins each of the positive electrode active material layer and the negative electrode active material layer to the separator and holds the electrolytic solution to electrically connect the positive electrode, the separator, and the negative electrode. According to this structure, each of the electrodes and the separator are brought into intimate contact with the adhesive resin layer. Besides, a liquid electrolytic solution is held in throughholes of the adhesive resin layer which connect each electrode and the separator so that satisfactory ion conduction can be secured through the electrode-electrolyte interface. Therefore, there is provided a lithium ion secondary battery excellent in charge and discharge characteristics which can have an increased energy density and a reduced thickness and can take an arbitrary shape. In addition, the battery capacity increases in proportion to the number of electrode laminates.

Second, third or forth lithium ion secondary battery of the invention is the above-described 1st battery wherein the plurality of electrode laminates are formed by interposing the positive electrode and the negative electrode alternately among a plurality of cut sheets of the separator, or between rolled separators, or between folded separators. According to these simple structures, there are provided thin and light lithium ion secondary batteries having excellent charge and discharge characteristics and having a battery capacity increased proportionally to the number of electrode laminates.

A fifth lithium ion secondary battery of the invention is the above-described 1st battery wherein the porosity of the porous adhesive resin layer is equal to or greater than that of the separator.

A sixth lithium ion secondary battery of the invention is the above-described 5th battery wherein the porous adhesive resin layer has a porosity of 35% or greater. Where the porosity of the porous adhesive resin layer is equal to or greater than that of the separator, e.g., 35% or greater, the adhesive resin layer holding an electrolytic solution has a proper ion conduction resistivity.

A seventh lithium ion secondary battery of the invention is the 1st battery wherein the ion conduction resistivity of the adhesive resin layer holding an electrolytic solution is equal to or smaller than that of the separator holding an electrolytic solution. According to this aspect, deterioration in charge and discharge characteristics are prevented, and excellent charge and discharge characteristics can be maintained.

An eighth lithium ion secondary battery of the invention is the above-described first battery wherein the joint strength between the separator and the positive electrode active material layer is equal to or greater than that between the positive electrode active material layer and the positive electrode current collector, and the joint strength between the separator and the negative electrode layer is equal to or greater than that between the negative electrode active material layer and the negative electrode current collector. According to this aspect, fracture of the electrodes takes place preferentially over delamination between the separator and the electrodes; the electrodes and the separator are brought into intimate contact with sufficient joint strength; and electrical connections between electrodes are maintained sufficiently.

A ninth lithium ion secondary battery of the invention is the above-described first battery wherein the adhesive resin layer comprises a fluorocarbon resin or a mixture mainly comprising a fluorocarbon resin.

A tenth lithium ion secondary battery of the invention is the above-described 9th battery wherein the fluorocarbon resin is polyvinylidene fluoride.

An eleventh lithium ion secondary battery of the invention is the above-described 1st battery wherein the adhesive resin layer comprises polyvinyl alcohol or a mixture mainly comprising polyvinyl alcohol.

Where a fluorocarbon resin or a mixture mainly comprising the same or polyvinyl alcohol or a mixture mainly comprising the same is used as an adhesive resin layer, a lithium ion secondary battery having the above-mentioned excellent characteristics can be obtained.

A process for producing the first lithium ion secondary battery according to the present invention comprises the steps of forming a positive electrode active material layer on a positive electrode current collector to prepare a positive electrode, forming a negative electrode active material layer on a negative electrode current collector to prepare a negative electrode, applying an adhesive resin solution to at least one of the surface of the positive electrode active material layer and the surface of a separator facing each other and at least one of the surface of the negative electrode active material layer and the surface of a separator facing each other, joining the positive electrode active material layer and the negative electrode active material layer alternately with the separator interposed therebetween, and heating the resulting electrode laminate under pressure to evaporate the solvent of the adhesive resin solution and form a porous adhesive resin layer, with which the positive electrode active material layer and the negative electrode active material layer are bonded to the separator to form a plurality of electrode laminates. This process provides easily and with good workability a lithium ion secondary battery which can have an increased energy density and a reduced thickness and can take an arbitrary shape while exhibiting excellent charge and discharge characteristics.

DISCUSSION OF THE PREFERRED EMBODIMENTS

Figure 1:
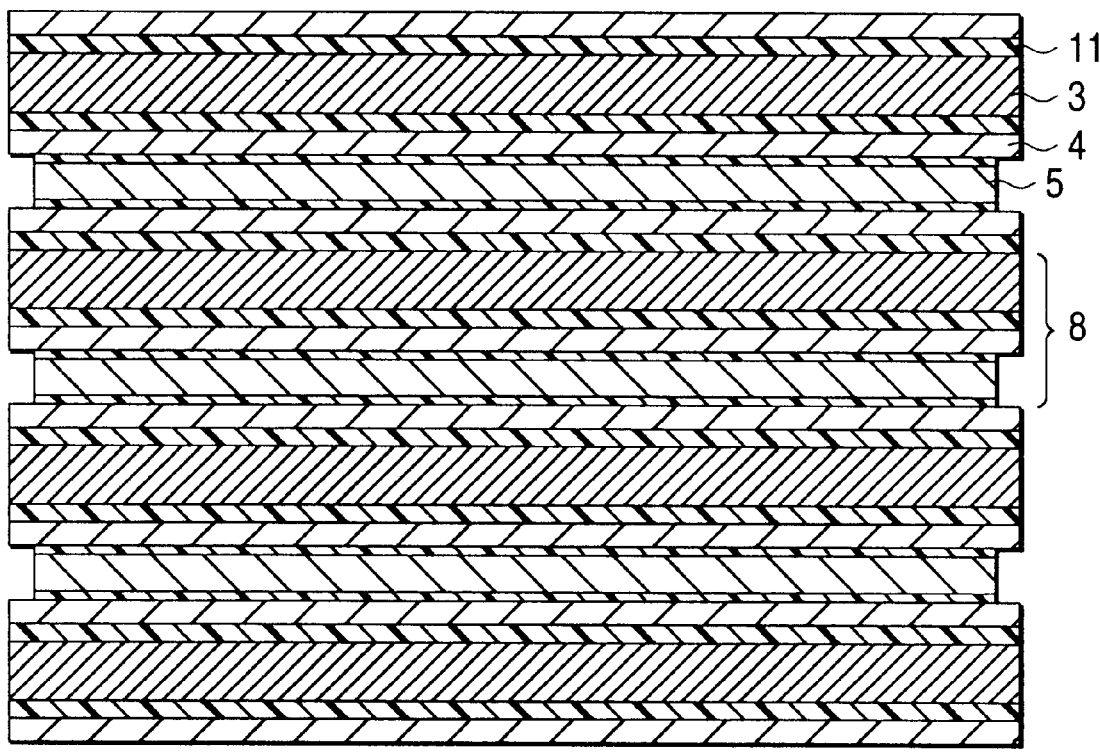
FIGS. 1, 2, and 3 are each a schematic cross section showing the battery structure and electrode laminate of the lithium ion secondary battery according to an embodiment of the present invention.
Figure 2:
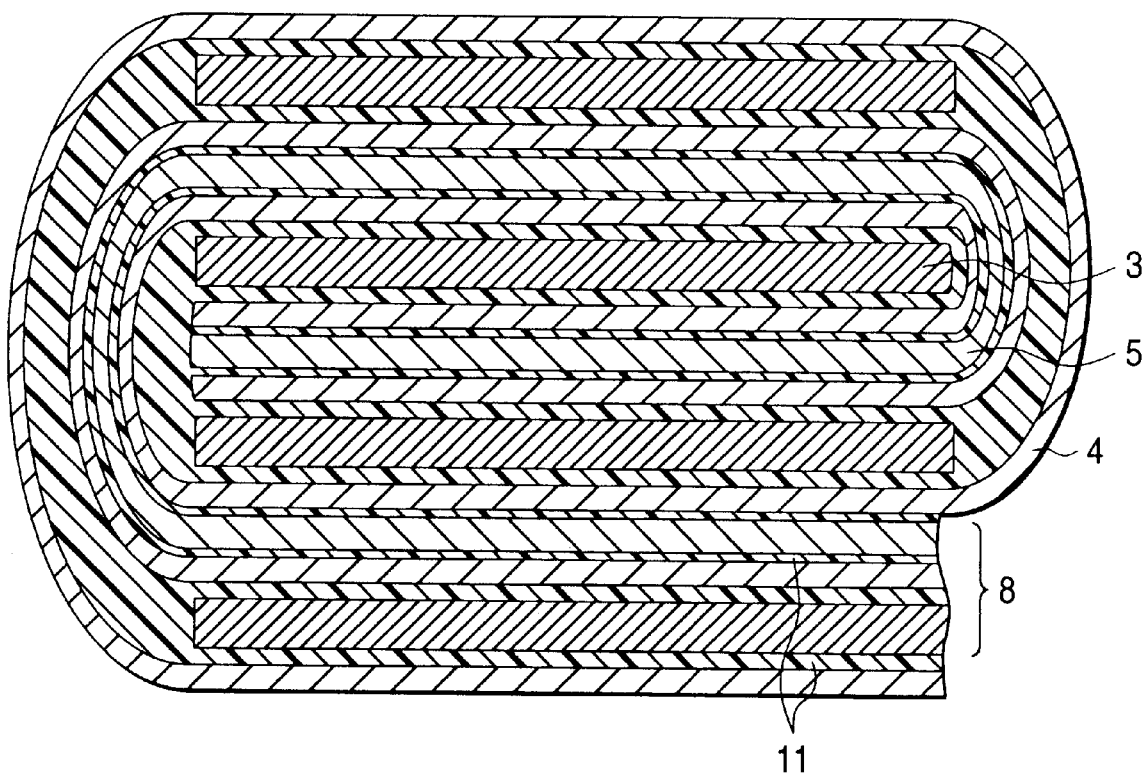
Figure 3:
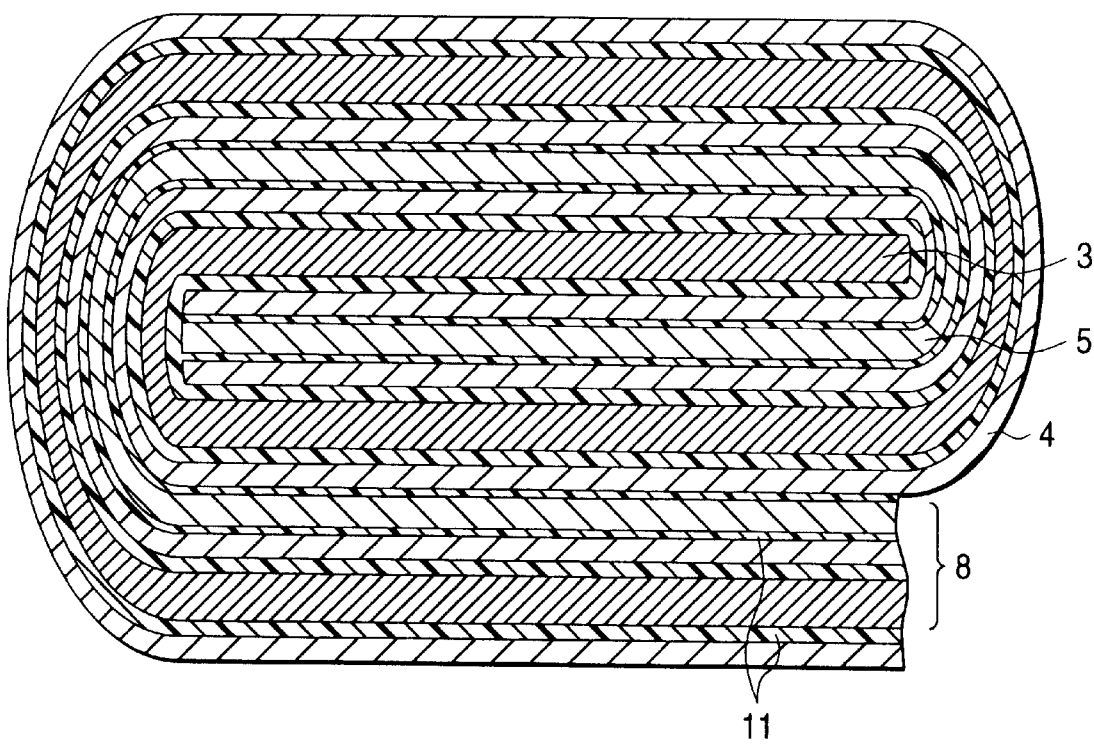
Figure 4:
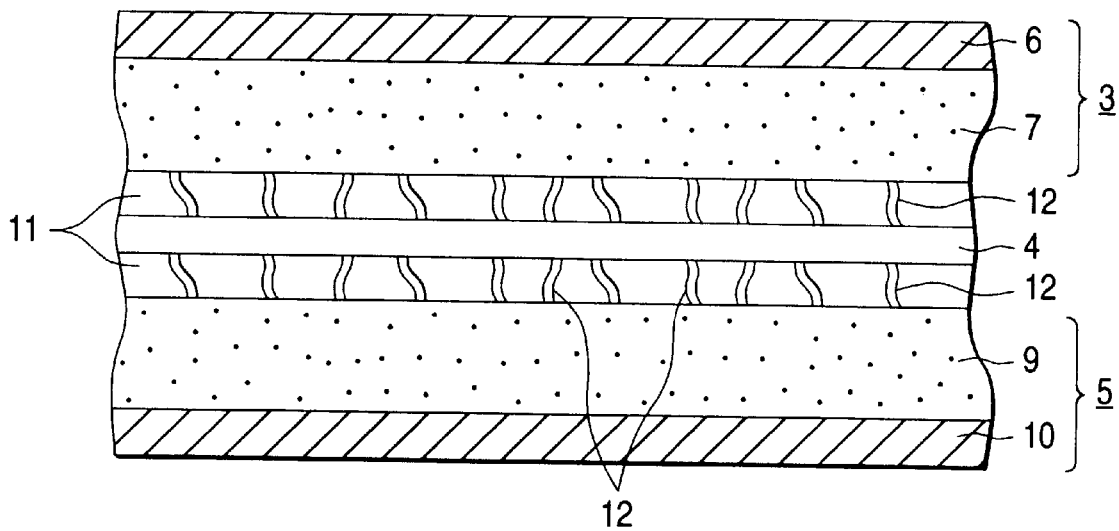
FIG. 4 is a schematic cross section illustrating the structure of the electrode laminate shown in FIGS. 1, 2 and 3.

FIGS. 1 through 3 each show a schematic cross section illustrating the constitution of the lithium ion secondary battery according to an embodiment of the invention, and FIG. 4 is a schematic cross section illustrating the structure of the electrode laminate shown in FIGS. 1 through 3. In these Figures, an electrode laminate, indicated by numeral 8, is composed of a positive electrode 3 made of a positive electrode active material layer 7 bonded to a positive electrode current collector 6, a negative electrode 5 made of a negative electrode active material layer 9 bonded to a negative electrode current collector 10, a separator 4 holding a lithium ion-containing electrolytic solution, and porous adhesive resin layers 11 which join the positive electrode active material layer 7 and the negative electrode active material layer 9 to the separator 4. The adhesive resin layer 11 has a large number of through-holes 12 which connect the positive electrode active material layer 7 and the negative electrode active material layer 9 to the separator 4. The electrolytic solution is held in the through-holes.

Each of the electrode layers (i. e., active material layers 7 and 9) and the separator 4 functioning as an electrolyte layer are joined via the porous adhesive resin layer 11. Therefore, the adhesive strength between the electrode and the separator is secured, making it possible to suppress separation between the electrode and the separator, which has been difficult in conventional batteries. An electrolytic solution being held in the inside of the adhesive resin layer 11, i.e., in the through-holes 12 that are made through the adhesive resin layer 11, satisfactory ion conduction -is guaranteed through the electrode-electrolyte interface to reduce ion conduction resistance between electrodes. It is thus made possible to establish equality to conventional lithium ion batteries having an outer case in terms of the quantity of ions moving in and out of the active material of the electrodes and the rate and quantity of migration of ions to the facing electrode. Electrical connections between electrodes can be maintained without applying outer force. Therefore, there is no need to use a firm case for maintaining the battery structure. This makes it feasible to reduce the weight and thickness of a battery and to design a battery shape freely. Further, excellent charge and discharge characteristics and battery performance as obtained from batteries using an electrolytic solution can be obtained.

Where the ion conduction resistivity of the adhesive resin layer 11 holding an electrolytic solution is- equal to or smaller than that of the separator 4 holding an electrolytic solution, the adhesive resin layer 11 would not cause deterioration in charge and discharge characteristics, and it is possible to obtain charge and discharge characteristics on the same level of conventional batteries.

The ion conduction resistivity of the adhesive resin layer 11 can be controlled chiefly by varying its porosity and thickness. The porosity can be adjusted by selecting the ratio of the adhesive resin to, for example, N-methylpyrrolidone in the adhesive resin solution forming the adhesive resin layer. The porosity is preferably equal to or greater than that of the separator 4, for example, 35% or more.

It is also preferred that the joint strength between the separator and the positive electrode active material layer be equal to or greater than that between the positive electrode active material layer and the positive electrode current collector, and the joint strength between the separator and the negative electrode active material layer be equal to or greater than that between the negative electrode active material layer and the negative electrode current collector. In brief, the adhesive strength is preferably equal to or greater than the strength bonding the active material layers to the respective current collectors into an integral body inside a battery. A peel test conducted after assembly into a battery provided confirmation that fracture of the electrode (separation between the active material layer and the current collector) takes place preferentially over separation between the electrode and the separator in case where the adhesive strength between the electrode and the separator is sufficiently high. The joint strength can be controlled by selection of the thickness of the adhesive resin layer and the kind of the adhesive resin.

The adhesive resins which can be used for joining an active material layer and a separator include those which neither dissolve in the electrolytic solution nor undergo electrochemical reaction inside a battery and are capable of forming a porous film, such as a fluorocarbon resin or a mixture mainly comprising a fluorocarbon resin and polyvinyl alcohol or a mixture mainly comprising polyvinyl alcohol. Specific examples of useful resins include polymers or copolymers containing a fluorine atom in the molecular structure thereof, e.g., vinylidene fluoride or tetrafluoroethylene, polymers or copolymers having vinyl alcohol in the molecular skeleton thereof, and their mixtures with polymethyl methacrylate, polystyrene, polyethylene, polypropylene, polyvinylidene chloride, polyvinyl chloride, polyacrylonitrile or polyethylene oxide. Polyvinylidene fluoride, which is a fluorocarbon resin, is particularly suitable.

The lithium ion secondary battery having the abovementioned constitution can be produced by applying an adhesive resin solution to at least one of the surface of the positive electrode active material layer 7 and the surface of the separator 4 facing each other and at least one of the surface of the negative electrode active material layer 9 and the surface of the separator 4 facing each other, inserting the positive electrode active material layer 7 and the negative electrode active material layer 9 alternately between the separators 4, and heating the resulting electrode laminate under pressure to evaporate the solvent of the adhesive resin solution and form a porous adhesive resin layer 11, with which the positive electrode active material layer 7 and the negative electrode active material layer 9 are bonded to the separator 4.

The active materials which can be used in the positive electrode include complex oxides of lithium and a transition metal, such as cobalt, nickel or manganese; chalcogen compounds containing lithium; or complex compounds thereof; and these complex oxides, Li-containing chalcogen compounds or complex compounds thereof that contain various dopant elements. While any substance capable of intercalating and disintercalating lithium ions, which takes the main part of a battery operation, can be used as a negative electrode active material, preferred active materials for use in the negative electrode include carbonaceous compounds, such as graphitizing carbon, non-graphitizing carbon, polyacene, and polyacetylene; and aromatic hydrocarbon compounds having an acene structure, such as pyrene and perylene. These active materials are used in a particulate state. Particle shaving a particle size of 0.3 to 20 $\mu$m can be used. A preferred particle size is 0.3 to 5 $\mu$m.

Any binder resin that is insoluble in an electrolytic solution and undergoes no electrochemical reaction in the electrode laminate can be used for binding an active material into an electrode plate. Examples of useful binder resins are homoor copolymers of vinylidene fluoride, ethylene fluoride, acrylonitrile, and ethylene oxide, and ethylene propylenediamine rubber.

Any metal stable within a battery can be used as a current collector. Aluminum is preferred for a positive electrode, and copper is preferred for a negative electrode. The current collector can be foil, net, expanded metal, etc. Those presenting a large void area, such as net and expanded metal, are preferred from the standpoint of ease of holding an electrolytic solution after adhesion.

Similarly to the adhesive resin used for adhesion of an active material layer and a separator, adhesive resins which can be used for adhesion between a current collector and an active material layer include those which neither dissolve in an electrolytic solution nor undergo electrochemical reaction inside a battery and are capable of forming a porous film. Examples include polymers having a fluorine molecule, e.g., vinylidene fluoride or tetrafluoroethylene, in the molecular structure thereof or mixtures thereof with polymethyl methacrylate, polystyrene, polyethylene, polypropylene, etc.; polymers or copolymers having vinyl alcohol in the molecular skeleton thereof or mixtures thereof with polymethyl methacrylate, polystyrene, polyethylene, polypropylene, polyvinylidene chloride, polyvinyl chloride, polyacrylonitrile, polyethylene oxide, etc. Polyvinylidene fluoride or polyvinyl alcohol are particularly suitable.

Any electron-insulating separator that has sufficient strength, such as porous film, net, and nonwoven fabric, can be used. While not limiting, polyethylene or polypropylene is a preferred material for the separator for their adhesiveness and safety.

The solvent and the electrolyte which provide an electrolytic solution serving as an ion conductor can be any of nonaqueous solvents and any of lithium-containing electrolyte salts that have been employed in conventional batteries. Examples of useful solvents include ethers, such as dimethoxyethane, diethoxyethane, diethyl ether, and dimethyl ether; esters, such as propylene carbonate, ethylene carbonate, diethyl carbonate, and dimethyl carbonate; and mixed solvents consisting of two members selected from the ether solvents or the ester solvents or mixed solvents consisting of one member selected from the former group and one member selected from the latter group. Examples of useful electrolytes are $LiPF_6$, $LiAsF_6$, $LiClO_4$, $LiBF_4$, $LiCF_3SO_3$, $LiN(CF_3SO_2)_2$, $LiN(C_2F_5SO_2)_2$, and $LiC(CF_3SO_2)_3$.

Methods for applying the adhesive resin include coating with a bar coater, spraying with a spray gun, and dip coating.

Figure 5:
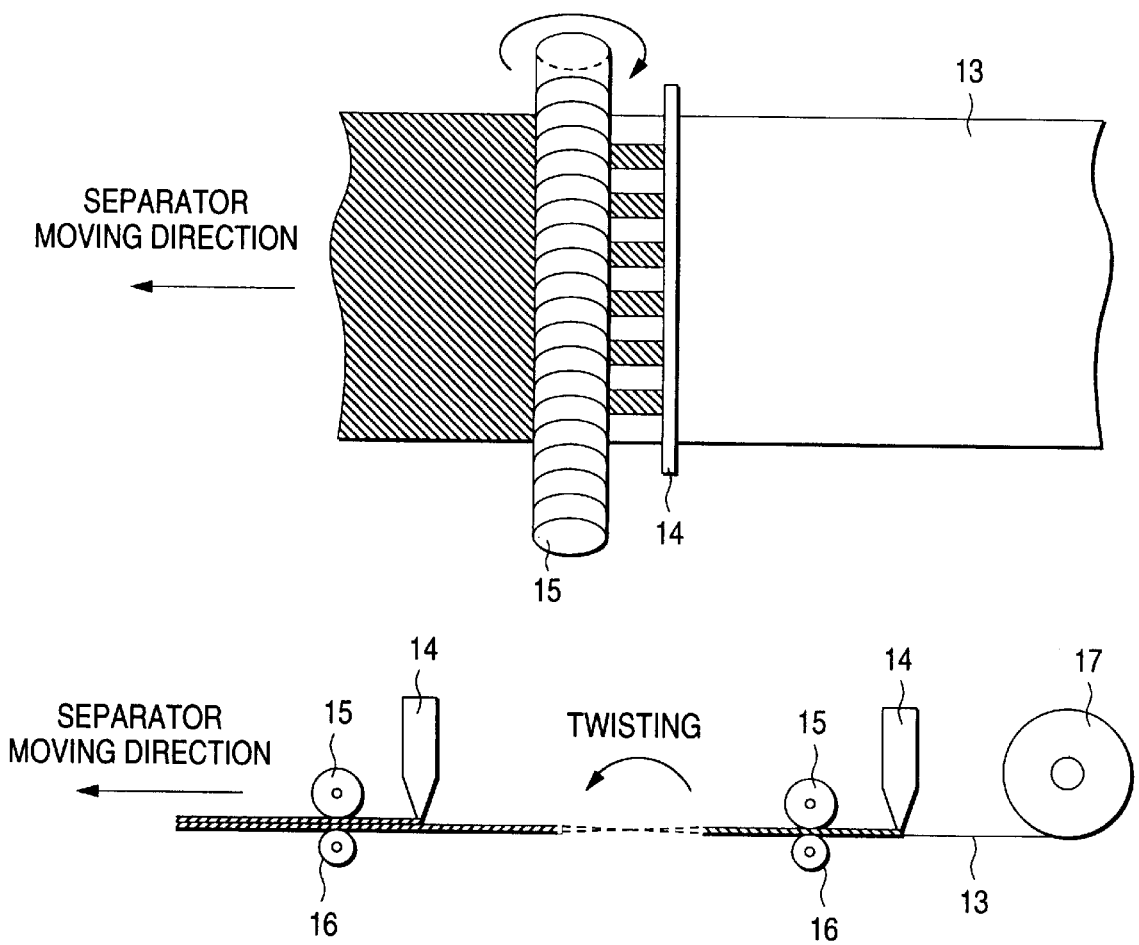
FIG. 5 illustrates a bar coating method for applying an adhesive resin solution according to an embodiment of the present invention.

Coating with a bar coater can be carried out as illustrated in FIG. 5. Drops of the adhesive resin are applied on a moving separator 13 in a line, and a bar coater 15 is rolled thereon to uniformly spread the adhesive resin over the entire surface of the separator. Subsequently, the separator 18 is twisted at 180°, and the other side is coated with the adhesive resin in the same manner. According to this coating method, a great length of a separator can be coated with an adhesive resin uniformly and speedily. Numerals 14, 16, and 17 indicate an applicator for delivering drops of the adhesive resin, a back-up roll, and a roll of a separator, respectively.

Figure 6:
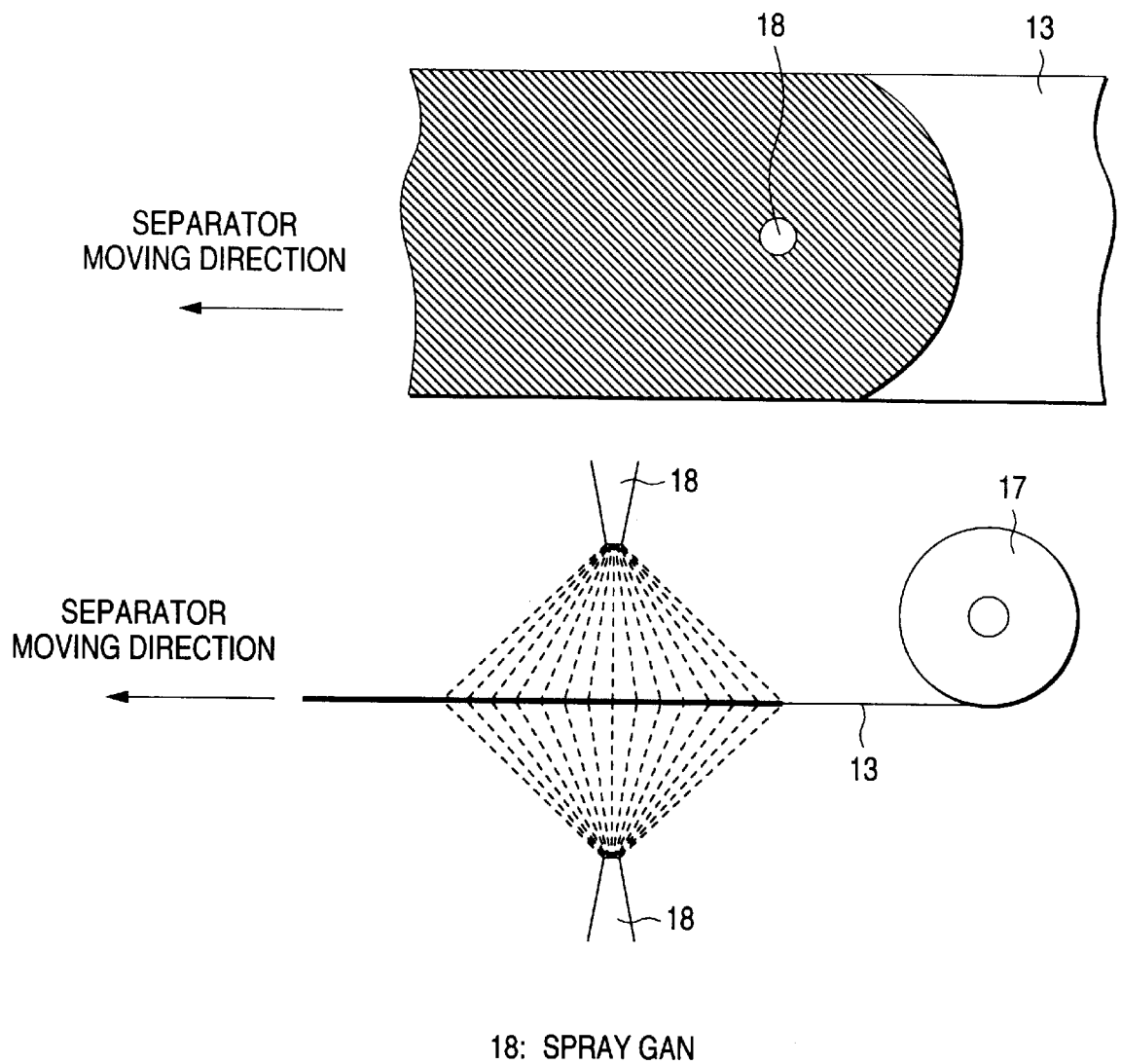
FIG. 6 illustrates a method for applying an adhesive resin solution with a spray gun according to an embodiment of the present invention.

Coating with a spray gun can be conducted as illustrated in FIG. 6. An adhesive resin solution or a liquid adhesive resin is charged in a spray gun 18 and sprayed onto a separator 13 to apply the adhesive resin to the separator 13. At least one spray gun 18 can be set on each side of the separator 13 to continuously spray the adhesive resin solution while moving the separator 13, whereby the adhesive resin solution is continuously applied to both sides of the separator. According to this method, a great length of a separator can be treated with the adhesive resin speedily similarly to the bar coating method.

Figure 7:
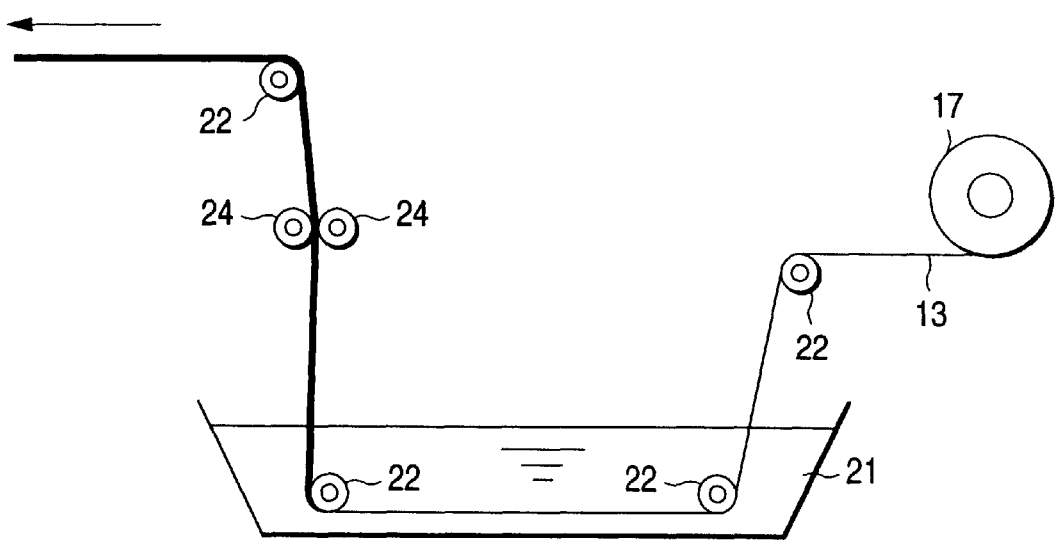
FIG. 7 illustrates a dip coating method for applying an adhesive resin solution according to an embodiment of the present invention.

Dip coating is a coating method in which a separator is dipped in an emulsified solution of an adhesive resin and pulled up thereby to apply the adhesive resin to both sides of the separator. As shown in FIG. 7, a separator 13 is dipped in an emulsified solution of an adhesive resin (hereinafter referred to as an adhesive resin emulsion) 21 and then pulled up through squeegee rolls 24 to remove the excess adhesive resin emulsion to apply the adhesive resin to the entire surface of the separator. Numeral 22 indicates back-up rolls. According to the dip coating method, the coating step can be simplified, and a large length of a separator can be coated with an adhesive resin speedily.

The present invention will now be illustrated in greater detail with reference to Examples, but the present invention is by no means limited thereto.

EXAMPLE 1

Preparation of Positive Electrode

Eighty-seven parts by weight of $LiCoO_2$, 8 parts by weight of graphite powder, and 5 parts of polyvinylidene fluoride were dispersed in N-methylpyrrolidone to prepare a positive electrode active material paste. The paste was applied with a doctor blade to a coating thickness of 300 $\mu$m to form an active material film. A 30 $\mu$m thick aluminum net as a positive electrode current collector was placed thereon, and the positive electrode active material paste was again spread on the net with a doctor blade to a thickness of 300 $\mu$m. The double-coated aluminum net was allowed to stand in a drier kept at 60° C. for 60 minutes to make the paste layers half-dried. The resulting laminate was lightly pressed by passing through a pair of rotating rolls with a nip of 550 $\mu$m to prepare a positive electrode.

The positive electrode was immersed in an electrolytic solution. The peel strength between the positive electrode active material layer and the positive electrode current collector measured after the immersion was found to be 20 to 25 gf/cm.

Preparation of Negative Electrode

Ninety-five parts by weight of Mesophase Microbead Carbon (a trade name, produced by Osaka Gas Co., Ltd.) and 5 parts of polyvinylidene fluoride were dispersed in N-methylpyrrolidone (hereinafter abbreviated as NMP) to prepare a negative electrode active material paste. The paste was applied with a doctor blade to a thickness of 300 $\mu$m to make an active material film. A 20 $\mu$m thick copper net as a negative electrode current collector was placed thereon, and the negative electrode active material paste was again spread thereon with a doctor blade to a thickness of 300 $\mu$m. The laminate was allowed to stand in a drier at 60° C. for 60 minutes to make the paste half-dried. The laminate was lightly pressed by passing through a pair of rotating rolls with a nip of 550 $\mu$m to prepare a negative electrode.

The peel strength between the negative electrode active material layer and the negative electrode current collector measured after immersion in an electrolytic solution was found to be 10 to 15 gf/cm.

Preparation of Adhesive Resin Solution

Five parts by weight of polyvinylidene fluoride and 95 parts by weight of N-methylpyrrolidone (hereinafter abbreviated as NMP) were mixed and thoroughly stirred to prepare a viscous and uniform adhesive resin solution.

Preparation of Battery

The adhesive resin solution thus prepared was applied to one side of two separators.

Application of the adhesive resin solution was performed in accordance with the bar coating method shown in FIG. 5. A separator 13 was taken off a rolled porous polypropylene sheet (Cellguard #2400, produced by Hoechest) having a width of 12 cm and a thickness of 25 µm, and drops of the adhesive resin solution were put on a side of the separator in a line perpendicular to the take-off direction. A bar coater 15 having a filament of 0.5 mm in diameter wound tightly around a core tube of 1 cm in diameter was rotated synchronously with the movement of the separator 13, whereby the line of drops of the adhesive resin solution was spread uniformly over the entire surface of the separator 13. The spread of the adhesive resin can be adjusted by varying the amount of the adhesive resin solution dropped. Before the adhesive dried, the above-prepared positive electrode (or negative electrode) of band form was sandwiched in between a pair of the separators with their coated sides inward, and the laminate was dried at 60° C.

The pair of the separators 4 having the positive electrode 3 (or negative electrode) bonded therebetween was punched to obtain a cut piece of prescribed size. The adhesive resin solution was applied to one side of the cut piece, and a cut piece of a negative electrode 5 (or positive electrode) having a prescribed size was stuck thereto. The adhesive resin solution was applied to a side of another cut piece of the separator having a prescribed size, and the coated side was stuck to the negative electrode 5 (or positive electrode) which had been stuck to the laminate. The above-described step was repeated to build up a battery body having a plurality of electrode laminates. The battery body was dried while applying pressure to prepare a tabular laminated battery body as shown in FIG. 1. On drying, the adhesive resin layer evaporated NMP to become a porous adhesive resin layer having through-holes connecting the positive and negative electrodes and the separator.

Current collecting tabs each connected to the end of every positive current collectors and every negative current collectors of the tabular laminated battery body were spot-welded among the positive electrode laminates and among the negative electrode laminates, respectively, to complete parallel electrical connections in the tabular laminated battery body.

The tabular laminated battery body was immersed in an electrolytic solution consisting of 1.0 mol/dm$^3$ of lithium hexafluorophosphate in a 1:1 (by mole) mixed solvent of ethylene carbonate and dimethyl carbonate, and the impregnated battery body was heat-sealed into an aluminum laminate film pack to complete a battery having the tabular laminated battery body.

After immersion in the electrolytic solution, the peel strength between the positive electrode active material layer and the separator and that between the negative electrode active material layer and the separator were 25 to 30 gf/cm and 15 to 20 gf/cm, respectively.

In the resulting lithium ion secondary battery, the separator 4 was in intimate contact with the positive electrode 3 and the negative electrode 5 via the adhesive resin layers 11. The adhesive resin layer 11 had a great number of through-holes 12 which connect the separator 4 and the electrodes 3 and 5 and in which the electrolytic solution was held to secure satisfactory ion conduction. Therefore, a thin and light battery having excellent charge and discharge characteristics was obtained without requiring outer pressure application, i.e., without needing a firm battery case. The battery exhibits a capacity proportional to the number of the electrode laminates 8.

Figure 8:
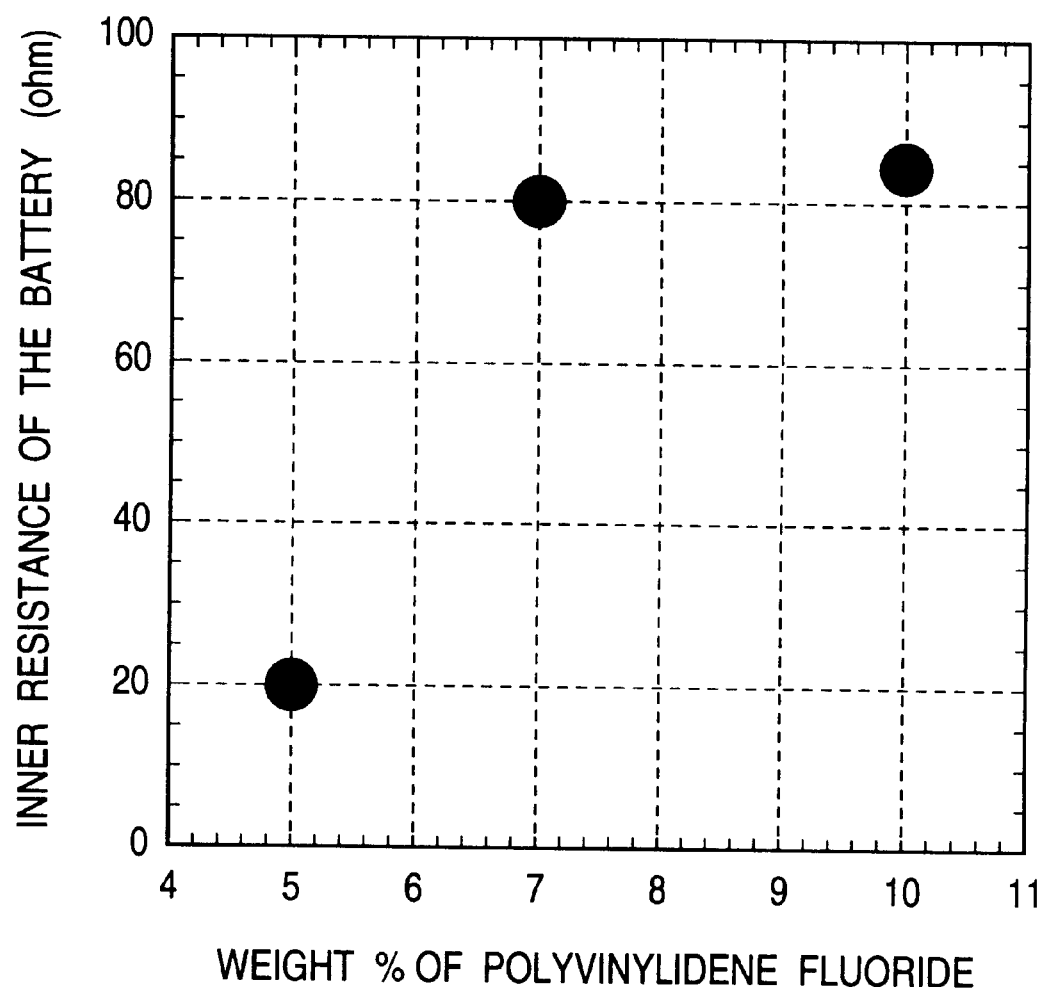
FIG. 8 is a characteristic plot of internal resistivity on amount of adhesive resin in the adhesive resin solution used in the formation of an adhesive resin layer according to an embodiment of the present invention.
Figure 9:
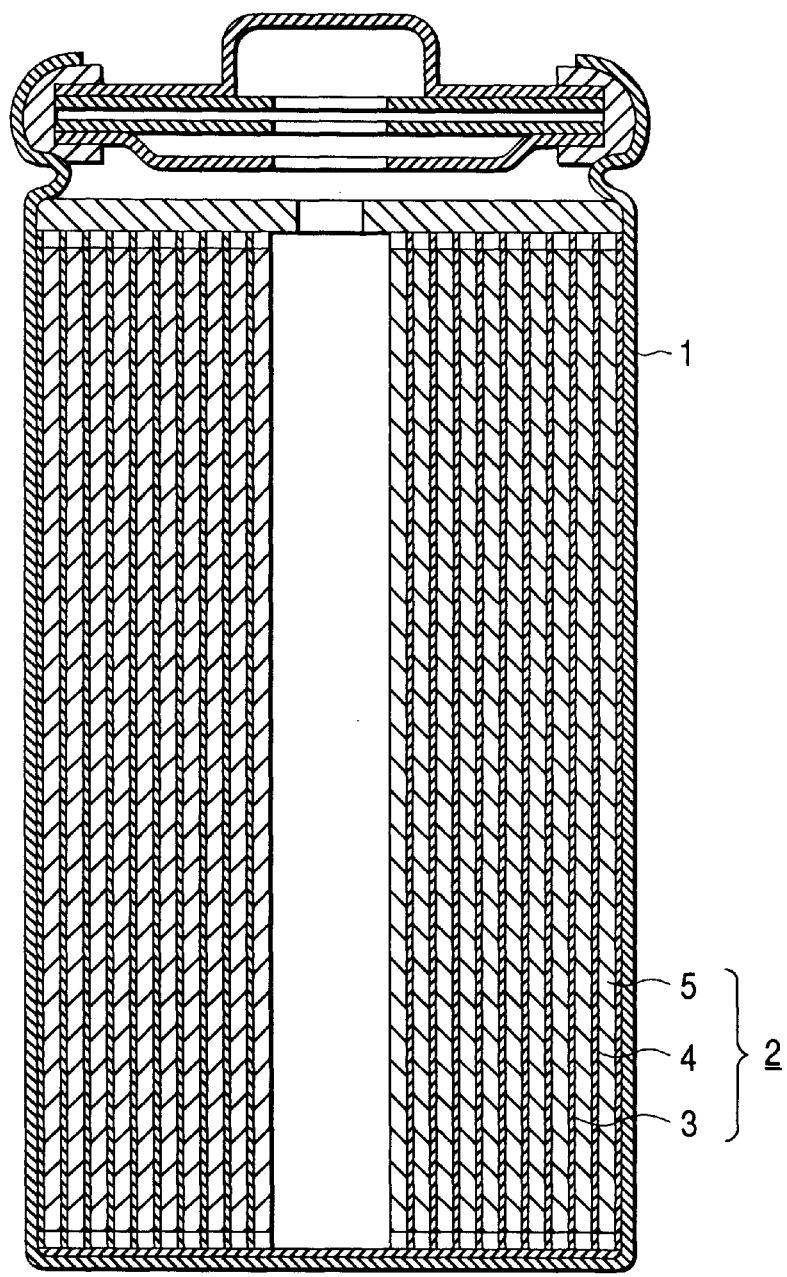
FIG. 9 is a schematic cross section of an example of conventional lithium ion secondary batteries.

The characteristic plot of FIG. 8 shows the internal resistivity of the battery with a varied amount of the adhesive resin in the adhesive resin solution; 5 parts, 7 parts and 10 parts by weight in MNP. It is seen that the resistivity increases abruptly with an increase from 5 parts to 7 parts by weight. Seeing that the thickness of the adhesive resin layer 11 is proportional to the amount of the adhesive resin in the adhesive resin solution, it is considered that retention and distribution of the electrolytic solution in the adhesive resin layer 11 change abruptly in that range, resulting in a steep rise of resistivity. The resistivity at 5 parts by weight was almost equal to the resistivity as measured on a battery in which no adhesive resin layer 11 was provided but a sufficient planar pressure was applied to electrodes 3 and 5 and a separator 4.

EXAMPLE 2

A battery having the tabular laminated battery body shown in FIG. 1 was prepared in the same manner as in Example 1, except for changing the adhesive resin solution used in Example 1.

Preparation of Adhesive Resin Solution

A viscous adhesive resin solution was prepared by mixing N-methylpyrrolidone with polytetrafluoroethylene, a vinylidene fluoride-acrylonitrile copolymer, a mixture of polyvinylidene fluoride and polyacrylonitrile, a mixture of polyvinylidene fluoride and polyethylene oxide, a mixture of polyvinylidene fluoride and polyethylene terephthalate, a mixture of polyvinylidene fluoride and polymethyl methacrylate, a mixture of polyvinylidene fluoride and polystyrene, a mixture of polyvinylidene fluoride and polypropylene, or a mixture of polyvinylidene fluoride and polyethylene at the same mixing ratio.

A battery having a tabular laminated battery body was prepared by using each of the adhesive resin solutions in the same manner as in Example 1.

After the tabular laminated battery body was immersed in the electrolytic solution, the peel strength between the positive electrode active material layer and the separator and that between the negative electrode active material layer and the separator were 25 to 70 gf/cm and 15 to 70 gf/cm, respectively.

EXAMPLE 3

A battery having the tabular laminated battery body shown in FIG. 1 was prepared in the same manner as in Example 1, except for changing the adhesive resin solution shown in Example 1.

Preparation of Adhesive Resin Solution:

A viscous adhesive resin solution was prepared from polyvinyl alcohol, a mixture of polyvinyl alcohol and polyvinylidene fluoride, a mixture of polyvinyl alcohol and polyacrylonitrile, or a mixture of polyvinyl alcohol and polyethylene oxide by mixing with or dissolving in NMP.

A battery having a tabular laminated battery body was prepared by using each of the adhesive resin solutions in the same manner as in Example 1.

After the tabular laminated battery body was immersed in the electrolytic solution, the peel strength between the positive electrode active material layer and the separator and that between the negative electrode active material layer and the separator were both 20 gf/cm or more.

EXAMPLE 4

A battery having a tabular laminated battery body of roll form as shown in FIG. 2 was prepared by using the positive and negative electrodes shown in Example 1 and the adhesive resin solutions shown in Examples 1 to 3.

Preparation of Battery

The adhesive resin solution was applied to a side of two separators of band form taken off a rolled porous polypropylene sheet (Cellguard #2400, produced by Hoechest). The negative electrode (or positive electrode) of band form was sandwiched and stuck between the two separators with their coated side inward, and the laminate was put in a warm air drier at 60° C. for 2 hours to evaporate NMP.

Application of the adhesive resin solution was carried out by the bar coating method illustrated in FIG. 5.

The adhesive resin solution was then applied to one of the paired separators 4 of band form having the negative electrode 5 (or positive electrode) therebetween. One end of the adhesive-coated separator was folded back at a prescribed length, the positive electrode 3 (or negative electrode) was inserted into the fold, and the laminate was passed through a laminator. Subsequently, the adhesive resin solution was applied to the other separator of band form, and another piece of the positive electrode (or negative electrode) was stuck thereto at the position facing the positive electrode 3 (or negative electrode) having been inserted into the fold. The paired separators were rolled up to make an oblong ellipsoid. The separators were again rolled up with a still another cut piece of the positive electrode 3 (or negative electrode) inserted therein. These steps were repeated to form a battery body having a plurality of electrode laminates. The battery body was dried under pressure to obtain a tabular laminated battery body of roll form as shown in FIG. 2.

A current collector tab was connected to the every end of the positive electrode current collectors and the negative electrode current collectors of the resulting tabular laminated battery body, and the current collector tabs were spot welded to establish parallel electrical connections among the positive electrodes and among the negative electrodes. The tabular roll type laminated battery body was immersed in an electrolytic solution comprising an ethylene carbonate/dimethyl carbonate mixed solvent (1:1 by mole) having dissolved therein 1.0 mol/dm$^3$ of lithium hexafluorophosphate and heat-sealed into an aluminum laminate film pack to make a battery.

The peel strength between the positive electrode active material layer and the separator and between the negative electrode active material layer and the separator as measured after immersion in the electrolytic solution was found to be 25 to 30 gf/cm and 15 to 20 gf/cm, respectively.

EXAMPLE 5

A battery having a tabular roll type laminated battery body as shown in FIG. 3 was prepared by using the positive and negative electrodes shown in Example 1 and the adhesive resin solutions shown in Examples 1 to 3. The difference from Example 4 lies in that a laminate of the positive electrode, the negative electrode, and the separators were rolled up simultaneously.

Preparation of Battery

Two separators 4 of band form were taken off rolled porous polypropylene sheets (Cellguard #2400, produced by Hoechest). The negative electrode 5 (or positive electrode) of band form was arranged between the two separators 4, and the positive electrode 3 (or negative electrode) of band form was placed on the outer side of one of the separators 4 with a prescribed length of its starting end sticking out over the end of that separator 4. The adhesive resin solution was applied to the inner side of the paired separators 4 and the outer side of one of the separators on which the positive electrode 3 (or negative electrode) had been arranged. The positive electrode 3 (or negative electrode), the two separators 4, and the negative electrode 5 (or positive electrode) were stuck together and passed through a laminator. The adhesive resin solution was applied to the outer side of the other separator 4, and the sticking end of the positive electrode 3 (or negative electrode) was folded back and stuck to the coated side of the separator 4. The laminate was rolled up in such a manner that the folded positive electrode 3 (or negative electrode) might be wrapped in, making an oblong ellipsoid, to form a battery body comprising a plurality of electrode laminates. The battery body was dried in a warm air drier at 60° C. for 2 hours under pressure to evaporate NMP to prepare a tabular roll type laminated battery body.

The application of the adhesive resin solution was conducted by the bar coating method illustrated in FIG. 5.

Current collector tabs connected to the every end of the positive electrode current collectors and the negative electrode current collectors of the resulting tabular roll type laminated battery body were spot welded to establish electrical connections among the positive electrodes and among the negative electrodes.

The roll type tabular battery body was immersed in an electrolytic solution comprising an ethylene carbonate/dimethyl carbonate mixed solvent (1:1 by mole) having dissolved therein 1.0 mol/dm$^3$ of lithium hexafluorophosphate and heat-sealed into an aluminum laminate film pack to complete a battery.

EXAMPLE 6

While Examples 4 and 5 have shown examples in which the tabular laminated battery body is formed by rolling paired separator bands, the batter body may be such that is prepared by folding a pair of separator bands having a positive electrode (or negative electrode) of band form joined therebetween while sticking a cut piece of a negative electrode (or positive electrode) into each fold.

While in the foregoing examples the adhesive resin solution was applied by a bar coating method, it may be applied with a spray gun.

A separator 13 was taken off a rolled porous polypropylene sheet (Cellguard #2400, produced by Hoechest) having a width of 12 cm and a thickness of 25 µm, and the adhesive resin solution was sprayed to the separator by means of spray guns 18 filled with the adhesive resin solution to uniformly apply the adhesive resin solution to both sides of the separator 13. The amount of the adhesive resin solution to be applied can be adjusted by changing the amount to be sprayed.

While the foregoing examples have shown examples in which an active material layer is adhered to a current collector to form an electrode, electrodes in which an active material layer itself functions as a current collector are also useful.

Industrial Applicability

The present invention provides batteries which can have reduced size and weight and an arbitrary shape as well as improved performance and can be used in portable electronic equipment, such as portable personal computers and cellular phones.

What is claimed is:

1. A lithium ion secondary battery comprising a plurality of electrode laminates each having:
   a positive electrode comprising a positive electrode active material layer and a positive electrode current collector;
   a negative electrode comprising a negative electrode active material layer and a negative electrode current collector;
   a separator which is interposed between the positive electrode and the negative electrode and holds an electrolytic solution containing lithium ions; and
   a porous adhesive resin layer which joins each of the positive electrode active material layer and the negative electrode active material layer to the separator and holds the electrolytic solution to electrically connect the positive electrode, the separator, and the negative electrode,
   wherein an ion conduction resistivity of the adhesive resin layer holding the electrolytic solution is equal to or smaller than that of the separator holding the electrolytic solution.

2. A lithium ion secondary battery according to claim 1, characterized in that the plurality of electrode laminates are formed by interposing each of the positive electrodes and each of the negative electrode alternately among a plurality of cut sheets of the separator.

3. A lithium ion secondary battery according to claim 1, characterized in that the plurality of electrode laminates are formed by interposing each of the positive electrodes and each of the negative electrodes alternately between rolled separators.

4. A lithium ion secondary battery according to claim 1, characterized in that the plurality of electrode laminates are formed by interposing the positive electrode and the negative electrode alternately between folded separators.

5. A lithium ion secondary battery according to claim 1, characterized in that the porosity of the porous adhesive resin layer is equal to or greater than that of the separator.

6. A lithium ion secondary battery according to claim 1, characterized in that the porous adhesive resin layer has a porosity of 35% or greater.

7. A lithium ion secondary battery according to claim 1, characterized in that the adhesive resin layer comprises a fluorocarbon resin or a mixture mainly comprising a fluorocarbon resin.

8. A lithium ion secondary battery according to claim 7, characterized in that the fluorocarbon resin is polyvinylidene fluoride.

9. A lithium ion secondary battery according to claim 1, characterized in that the adhesive resin layer comprises polyvinyl alcohol or a mixture mainly comprising polyvinyl alcohol.

10. A lithium ion secondary battery comprising a plurality of electrode laminates each having:
    a positive electrode comprising a positive electrode active material layer and a positive electrode current collector;
    a negative electrode comprising a negative electrode active material layer and a negative electrode current collector;
    a separator which is interposed between the positive electrode and the negative electrode and holds an electrolytic solution containing lithium ions; and
    a porous adhesive resin layer which joins each of the positive electrode active material layer and the negative electrode active material layer to the separator and holds the electrolytic solution to electrically connect the positive electrode, the separator, and the negative electrode,
    wherein a joint strength between the separator and the positive electrode active material layer is equal to or greater than that between the positive electrode active material layer and the positive electrode current collector, and a joint strength between the separator and the negative electrode layer is equal to or greater than that between the negative electrode active material layer and the negative electrode current collector.

11. A process for producing a lithium ion secondary battery comprising the steps of:
    forming a positive electrode active material layer on a positive electrode current collector to prepare a positive electrode,
    forming a negative electrode active material layer on a negative electrode current collector to prepare a negative electrode,
    applying an adhesive resin solution to at least one of the surface of the positive electrode active material layer and the surface of a separator facing each other and at least one of the surface of the negative electrode active material layer and the surface of a separator facing each other, joining the positive electrode active material layer and the negative electrode active material layer alternatively between the separators; and
    heating a resulting electrode laminate under pressure to evaporate a solvent of the adhesive resin solution and form a porous adhesive resin layer, with which the positive electrode active material layer and the negative electrode active material layer are bonded to the separator to form a plurality of electrode laminates,
    wherein an ion conduction resistivity of the adhesive resin layer holding an electrolytic solution is equal to or smaller than that of the separator holding an electrolytic solution.

12. A process for producing a lithium ion secondary battery comprising the steps of:
    forming a positive electrode active material layer on a positive electrode current collector to prepare a positive electrode;
    forming a negative electrode active material layer on a negative electrode current collector to prepare a negative electrode;
    applying an adhesive resin solution to at least one of the surface of the positive electrode active material layer and the surface of a separator facing each other and at least one of the surface of the negative electrode active material layer and the surface of a separator facing each other, joining the positive electrode active material layer and the negative electrode active material layer alternatively between the separators; and
    heating a resulting electrode laminate under pressure to evaporate a solvent of the adhesive resin solution and form a porous adhesive resin layer, with which the positive electrode active material layer and the negative electrode active material layer are bonded to the separator to form a plurality of electrode laminates,
    wherein a joint strength between the separator and the positive electrode active material layer is equal to or greater than that between the positive electrode active material layer and the positive electrode current collector, and a joint strength between the separator and the negative electrode layer is equal to or greater than that between the negative electrode active material layer and the negative electrode current collector.

* * * * *